(12) United States Patent
Fleischer et al.

(10) Patent No.: US 11,216,281 B2
(45) Date of Patent: Jan. 4, 2022

(54) FACILITATING DATA PROCESSING USING SIMD REDUCTION OPERATIONS ACROSS SIMD LANES

(71) Applicant: INTERNATIONAL BUSINESS MACHINES CORPORATION, Armonk, NY (US)

(72) Inventors: Bruce Fleischer, Bedford Hills, NY (US); Kailash Gopalakrishnan, New York, NY (US); Jinwook Oh, Fort Lee, NJ (US); Sunil Shukla, Scarsdale, NY (US); Silvia Mueller, Altdorf (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/412,072

(22) Filed: May 14, 2019

(65) Prior Publication Data

US 2020/0364056 A1  Nov. 19, 2020

(51) Int. Cl.
  *G06F 9/38* (2018.01)
  *G06F 15/80* (2006.01)
  *G06F 9/30* (2018.01)

(52) U.S. Cl.
  CPC ........ *G06F 9/3887* (2013.01); *G06F 9/30036* (2013.01); *G06F 15/8015* (2013.01)

(58) Field of Classification Search
  CPC .................................................. G06F 9/3887
  See application file for complete search history.

(56) References Cited

U.S. PATENT DOCUMENTS

| | | | |
|---|---|---|---|
| 8,200,940 B1 * | 6/2012 | Lindholm | G06F 9/5066 345/418 |
| 9,081,562 B2 * | 7/2015 | Hargil | G06F 9/30032 |
| 2003/0200426 A1 * | 10/2003 | Lee | G06F 9/30181 712/241 |
| 2008/0184211 A1 | 7/2008 | Nickolls et al. | |
| 2014/0095842 A1 * | 4/2014 | Caprioli | G06F 9/3012 712/222 |
| 2014/0115301 A1 * | 4/2014 | Sanghai | G06F 9/30065 712/220 |
| 2015/0378736 A1 | 12/2015 | Gueron | |
| 2016/0124905 A1 | 5/2016 | Lutz et al. | |
| 2017/0046153 A1 | 2/2017 | Mahurin | |
| 2017/0139676 A1 * | 5/2017 | Lutz | G06F 7/02 |
| 2017/0177351 A1 | 6/2017 | Ould-Ahmed-Vall | |
| 2018/0285316 A1 * | 10/2018 | Thorson | G06F 17/16 |

* cited by examiner

*Primary Examiner* — Michael J Metzger
(74) *Attorney, Agent, or Firm* — Griffiths & Seaton PLLC (57) ABSTRACT

Various embodiments are provided for facilitating data processing by one or more processors in a computing system. An instruction to be executed may be obtained. The instruction is a single instruction multiple data (SIMD) reduction operation of an operand vector with a plurality of vector elements. The SIMD reduction operation may be executed to produce a result vector with a plurality of alternative vector elements. One or more reduction functions may be performed on each of a pair of vector elements from the plurality of vector elements of the operand vector and a result of the one or more reduction functions may be placed in a corresponding vector element of the result vector.

20 Claims, 9 Drawing Sheets

610: OPCODE | RT | RS | E1 | ... | FUNC

- Opcode reduction instruction
- Func    specifier for the set of two-operand reduction functions
- RT      target vector register (address)
- RS      source vector register (address)
- E1      defines for the first operand of the reduction function, whether it's taken from the same SIMD lane, or from a different SIMD lane, and if so which lane
- E2      same as E1 but for the second operand of the reduction function

620: OPCODE | RT | E1 | E2 | ...

- Two-operand vector reduction function, to be performed in each lane
- RT      target vector register (address) – the result of the function in each lane is stored in that lane of the target register
- E1      first source vector specifier – depending on the specifier, either:
  a) a source register (address) with the value coming from the same lane,
  b) the value comes from some other lane of the target reg,
  where the other lane has a fixed dependence on the lane where the function takes place
- E2      same as E1 but for the second operand of the reduction function

FACILITATING DATA PROCESSING USING SIMD REDUCTION OPERATIONS ACROSS SIMD LANES

BACKGROUND OF THE INVENTION

Field of the Invention

The present invention relates in general to computing systems, and more particularly to, various embodiments for facilitating data processing using single instruction multiple data (SIMD) reduction operations across SIMD lanes in a computing system using a computing processor.

Description of the Related Art

Computing systems may be found in the workplace, at home, or at school. Due to the recent advancement of information technology and the growing popularity of the Internet, a wide variety of computer systems have been used in machine learning. Machine learning is a form of artificial intelligence that is employed to allow computers to evolve behaviors based on empirical data. Machine learning may take advantage of training examples to capture characteristics of interest of their unknown underlying probability distribution. Training data may be seen as examples that illustrate relations between observed variables. A major focus of machine learning research is to automatically learn to recognize complex patterns and make intelligent decisions based on data.

SUMMARY OF THE INVENTION

Various embodiments for facilitating data processing by one or more processors in a computing system, are provided. In one embodiment, by way of example only, a method for facilitating data processing using single instruction multiple data (SIMD) reduction operations across SIMD lanes in a computing system, again by a processor, is provided. An instruction to be executed may be obtained. The instruction is a single instruction multiple data (SIMD) reduction operation of an operand vector with a plurality of vector elements. The SIMD reduction operation may be executed to produce a result vector with a plurality of alternative vector elements. One or more reduction functions may be performed on each of a pair of vector elements from the plurality of vector elements of the operand vector and a result of the one or more reduction functions may be placed in a corresponding vector element of the result vector.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The present invention relates generally to the field of computing systems and facilitating data processing. In a computing system, an instruction set, or instruction set architecture (ISA), describes the aspects of a computer architecture visible to a programmer, including the native data types, instructions, registers, addressing modes, memory architecture, interrupt and exception handling, and external I/O (if any). The ISA is a specification of the set of all binary codes that are the native form of commands implemented by a particular CPU design. The set of binary codes for a particular ISA is also known as the machine language for that ISA.

Additionally, one technique for increasing computing performance for data processing in a computing system is to use Single Instruction Multiple Data (SIMD), which is a parallel computing mechanism in which a plurality of processors are configured to perform similar operations on different data. SIMD is a technique employed to achieve data level parallelism in a computing environment. This technique is commonly applied to a vector or array processor in which a processor is able to run mathematical operations on multiple data elements simultaneously. Said differently, the SIMD is also referred to as 'vectorizing' the data where operations are performed on multiple data elements at the same time, and in response to the same SIMD instruction. A SIMD processor device may execute an instruction stream over multiple input data streams ("lanes"). The SIMD processor device may include multiple processing lanes that handle different data points in a vector and simultaneously perform similar operations on all of the data points.

One of the challenges in a SIMD operation is the ability to do a reduction operation across one or more processing lanes such as, for example, when performing a SIMD op-reduce operation. A SIMD op-reduce operation may be defined as following. For a given binary operation "op" (e.g., an add reduction function), the SIMD op-reduce operation may op the data values in all SIMD lanes to produce one result. However, the reduction operations in the SIMD processors may be inefficient and require extensive computing resources such as, for example, requiring too many instructions, using too many registers, and/or requiring additional processing time.

Accordingly, a need exits to perform SIMD reductions across SIMD lanes that improve computing efficiencies by reducing processing time and reducing use of available computing resources on any existing binary operation while only requiring minimal, if any, additional control logic. In one aspect, the present invention provides for facilitating data processing in a computing system. An instruction to be executed may be obtained. The instruction is a single instruction multiple data (SIMD) reduction operation of an operand vector with a plurality of vector elements. The SIMD reduction operation may be executed to produce a result vector with a plurality of alternative vector elements. One or more reduction functions may be performed on each of a pair of vector elements from the plurality of vector elements of the operand vector and a result of the one or more reduction functions may be placed in a corresponding vector element of the result vector. It should be noted that the operand vector may be a source vector and the result vector may be the target vector. As used herein, reduction functions may include one or more arithmetical functions/operations (e.g., mathematical functions/operations) and/or logical functions/operations such as, for example, addition, multiplication, minimum, maximum, bitwise-AND, bitwise-OR, bitwise-XOR.

In an additional aspect, the present invention provides for facilitating processing by obtaining an instruction to be executed. The instruction to perform may be SIMD reduction operation of a vector operand with a plurality of vector elements producing a result vector with a plurality of vector elements. The instruction may be executed by 1) determining, based on a field (e.g., a control field) of the instruction, a reduction function to be performed (e.g., the reduction function is one of a plurality of two-operand reduction functions), 2) selecting, from a plurality of options for the reduction function, an two-operand reduction function to be used to operate on pairs of vector elements of the operand vector, and/or 3) selecting, based on the operand specifier of the instruction, for each vector element of the result vector a pair of vector elements of the vector operand. A reduction function may be performed on each of the pairs of vector elements of the operand vector, and the result may be placed/stored in the corresponding element of the result vector. In one aspect, the reduction function may include, but not limited to, addition (add), subtraction (sub), multiplication (mul) and division (div).

In an additional aspect, the present invention provides an additional valid operand specification (e.g., a "neighbor" or "N") in an instruction. If an operand specification is labeled as "N" (e.g., neighbor) in each SIMD lane, the corresponding operand is the value of the instruction's target register in a neighboring lane. The operand specifier ("specs"), the operand, and the SIMD lance where the operation occurred determines which SIMD lane supplies the operand data. Said differently, the SIMD lane supplies the operand data that is not dependent on the operation itself.

In an additional aspect, the operand specifier, in combination of element pairs (e.g., a pair of vector elements of a vector operand), may specify a vector register, a memory operand, and/or an operand from an I/O bus. The operand specifier may define for each element of a target vector, and each of its two corresponding source vector elements, whether the source vector element has the same vector element number or whether it has a different number (neighbor), and if has a different number that number has a fixed dependence on the value of the specifier and the target element number.

A $2^N$-way SIMD processor in which N reduction steps with a common operation provides a final result with one SIMD lane containing the reduction of the common operation on the $2^N$ lanes of one input. The $2^N$-way means each vector has $2^N$ elements or lanes. It takes N add-reduction steps to complete a full add-reduce (e.g., add all $2^N$ elements/lanes of one vector input and produce a result with that sum in a predetermined element of a final element. Said differently, starting with a $2^N$-way input vector and applying N reduction steps, a first SIMD lane of the final result vector may contain the result of the reduction operation applied to all lanes of the input vector. Thus, the result vector with a first SIMD lane of the result vector containing a result of applying a selected reduction function to all SIMD lanes of an 2N-way input vector after applying the SIMD reduction operation a selected N times, wherein N is a positive integer or selected value. That is, after applying a new instruction N number of times, one lane of the result has the result of applying an arithmetic function to all 2^N elements of the input.

With proper choice of source lanes, a SIMD binary instruction can be reduced across all SIMD lanes with a sequence of only that instruction, using both neighbor and register operand specs. An 8 SIMD type processor array (e.g.,"SIMD-8") reduction operation may be performed with one "neighbor" operand specification per operand. If the SIMD processor has stall logic, which detects instruction operands dependent on an incomplete prior instruction, the stall logic treats a "neighbor" specification as equal to the target register. For example, a (non-reduction) operation may specify register "R3" as the target, register "R1" as operand X, and register R2 as operand Y. If a prior instruction specified R1 as the target, this instruction is dependent (e.g., operand X needs the result of the previous instruction). The stall logic usually compares the operand spec fields of the next instruction with targets of incomplete instructions. Using the mechanisms of the illustrated embodiments, a reduction operation may specify register "R5" as target and 'N' as operand X. Operand X implicitly uses R5, but each SIMD lane of the execution logic uses a neighboring lane's element of R5. Thus, although the instruction's field with the operand X spec is not explicitly R5, the instruction may be dependent on an instruction whose target is R5—hence the current target spec should be used by the stall logic as the source for operand X.

Thus, the present invention provides the SIMD reduction operation for all existing binary operations and no single-operation reduction opcodes. The SIMD reduction operation does not require additional data movement instructions and has benefits such as, for example, shorter program, fewer registers used and lower latency. The SIMD reduction operation neighbors can be physically adjacent lanes thereby avoiding long hardware wires.

The present invention may also apply to deep learning such as, for example, add-reduce, max-reduce, and to deep learning accelerator hardware. For example, deep learning applications have a mix of data-parallel operations and SIMD reduction operation (which may be used to combine data from SIMD lanes). Since deep learning acceleration demands much higher utilization and power efficiency than general-purpose computing and the deep learning hardware requires simple instruction processing (e.g., in order and without instruction cracking), the present invention enables deep learning hardware to maintain reduced application size and register footprint.

It should be noted that one or more calculations may be performed using various mathematical operations or functions that may involve one or more mathematical operations (e.g., performing rates of change/calculus operations, solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
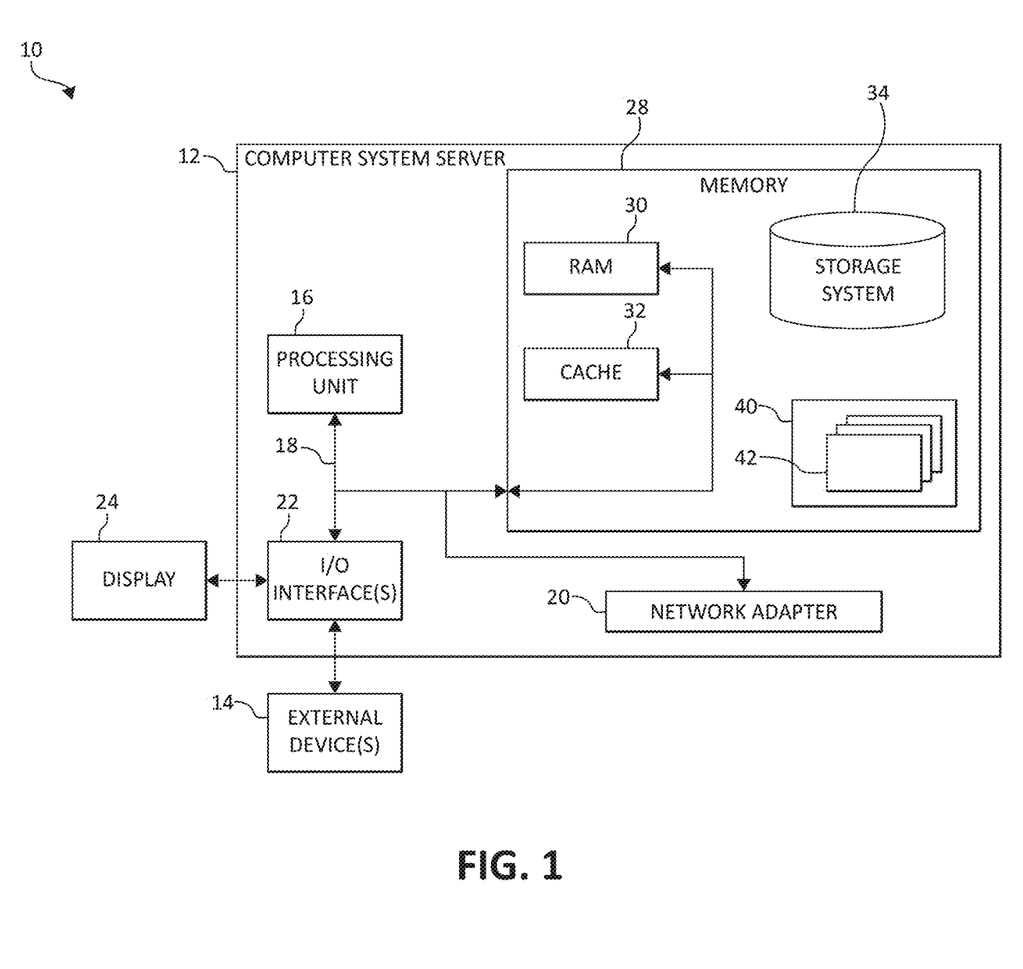
FIG. 1 is a block diagram depicting an exemplary cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
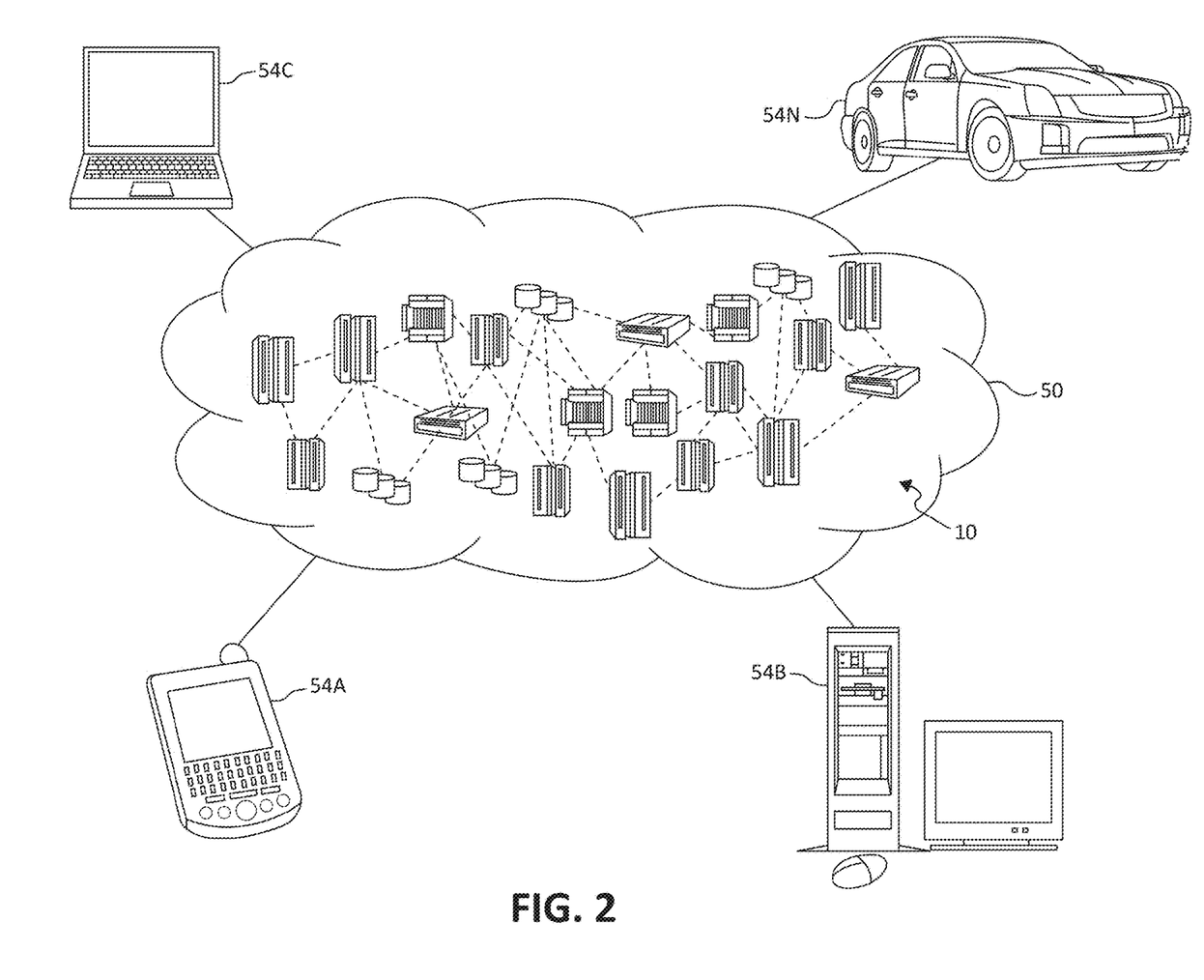
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
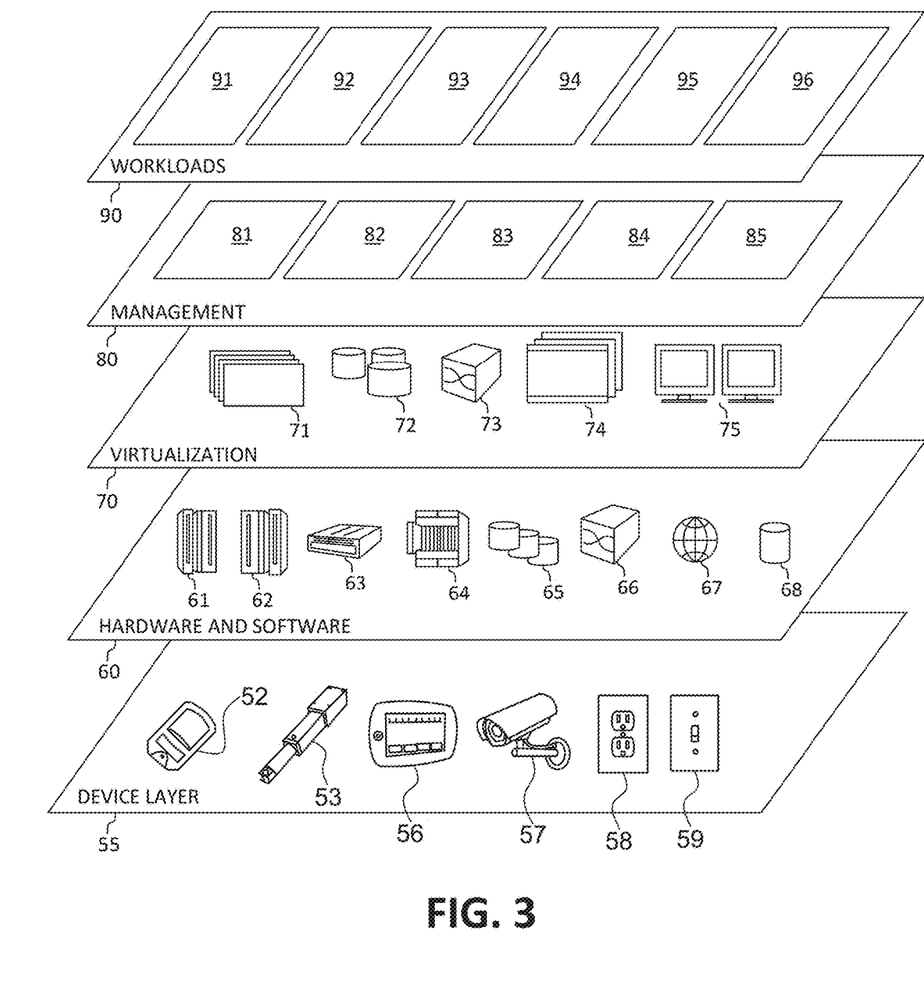
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for facilitating data processing using SIMD reduction operations across SIMD lanes. In addition, workloads and functions 96 for facilitating data processing using SIMD reduction operations across SIMD lanes may include such operations as analytics, entity and obligation analysis, and as will be further described, user and device management functions. One of ordinary skill in the art will appreciate that the workloads and functions 96 for facilitating data processing using SIMD reduction operations across SIMD lanes may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
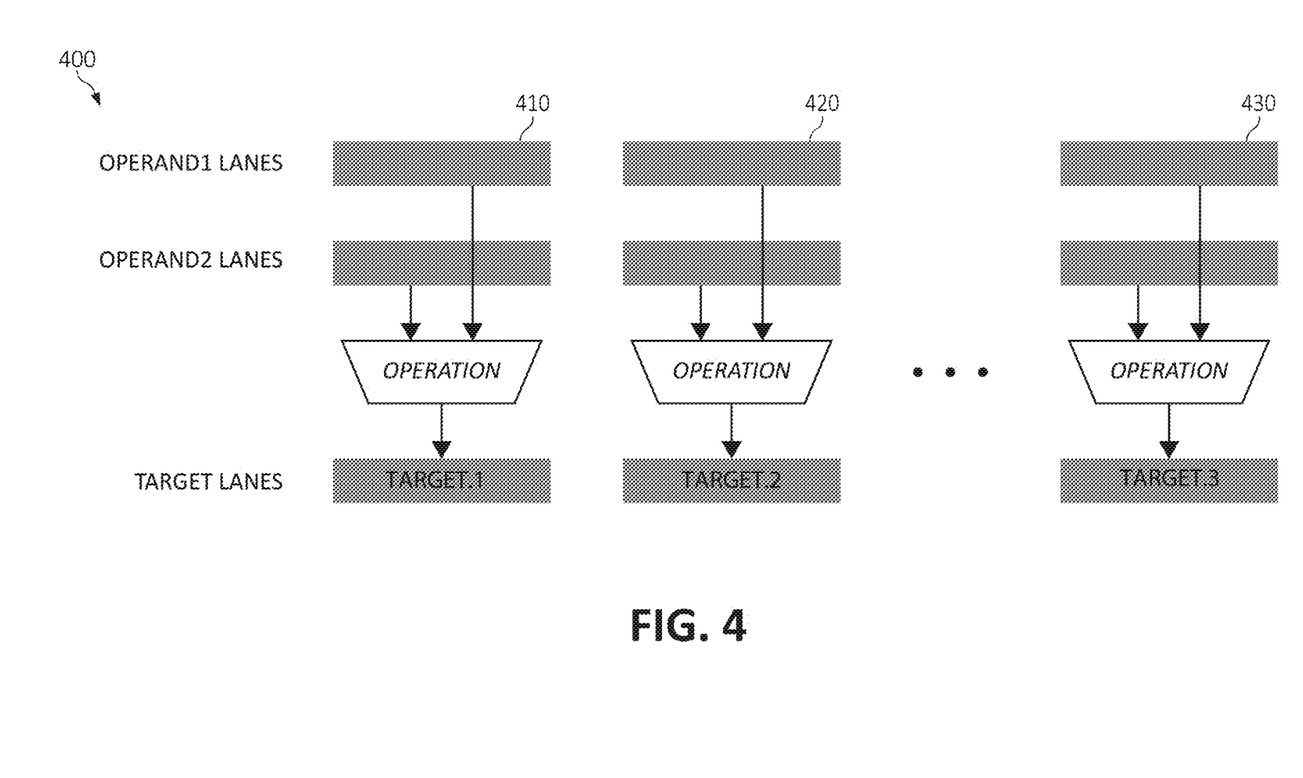
FIG. 4 is an additional block diagram depicting a data processing system with multiple single instruction multiple data (SIMD) lanes in accordance with another embodiment of the present invention.

FIG. 4 is a functional block diagram depicting a data processing system 400 with multiple SIMD lanes in accordance with some embodiments of the present invention. In one aspect, one or more of the components, modules, services, applications, and/or functions described in FIGS. 1-3 may be used in FIG. 4.

As depicted, each SIMD binary instruction for each lane such as, for example, "target.i" which represents each one of the target lanes (e.g., the target lanes in SIMD 410, 420, and 430). For example, the SIMD binary instruction may read as follows:

For all SIMD lanes i: target.i←operation(operand 1.i,operand 2.i)   (1), where operand 1 indicates the first operand, operand 2 represents the second operand. Target.1 may represent the first lane of the SIMD 410 and target.2 may represent the second lane of the SIMD 420, and/or target.3 represents the third lane of the SIMD 430. The ISA defines allowed values of operand specification fields in a binary instruction. In one aspect, some values of the operand specification fields may indicate register contents and/or special operands such as, for example, data link from another processor or a constant (e.g. 1.0). Each SIMD lane of the target results from applying operation to the values in the corresponding lane of the operands.

In an additional aspect, vector ISAs may include vector-reduce support, which may be associated with/tied to one operation (addition) and may require additional opcodes for each additional operation to be supported. In an additional aspect, other reduction instructions may only combine data from adjacent even and odd lanes and/or require intervening data movement instructions.

Currently, one or more permutations are required for moving data between lanes according to instructions until the data is in or lined up in a particular or desired lane. For example, current SIMD add-reduction operations operate as follows. In one aspect, permute and add instructions (or other binary SIMD instructions) may be alternated to move data into one SIMD lane from each of the other lanes and add the values in the one lane. The following pseudo-code for a SIMD-8 processor array for add-reduce operation of register A to register A.0 (e.g., 14 instructions, multiple dependencies) is depicted:

| | |
|---|---|
| perm: | B.0 ← A.1 |
| add: | A.0 ← A.0 + B.0 |
| perm: | B.0 ← A.2 |
| add: | A.0 ← A.0 + B.0 |
| ... | |
| perm: | B.0 ← A.7 |
| add: | A.0 ← A.0 + B.0 |

A permute (e.g., rotate) and vector add instructions may be alternated to reduce the data into half as many lanes at each step, until a vector is reduced into one lane, as illustrated in the following Pseudo-code (e.g., 6 instructions, all dependent):

```
perm:  B. (0:3) ← A(4:7) // B(4:7) are don't-care
vadd:  A ← A + B         // Initial A. (0:7) partially reduced into A(0:3)
perm:  B. (0:1) ← 4(2:3) // B(2:7) are don't-care
vadd:  A ← A + B         // Initial A. (0:7) partially reduced into A(0:1)
perm:  B.0 ← A.1         // B(1:7) are don't-care
vadd:  A ← A + B         // Initial A. (0:7) partially reduced into A.0
```

However, the alternating permutations (e.g., rotate) and vector add instructions may be time consuming and inefficient. The present invention addresses such inefficiencies and challenges such as, for example, by extending a set of operand specifiers ("spec"). Currently, however, many processor devices using operand specifiers are limited to only specifying a local register (at least logically), which is referred to as a "register field." In one aspect, special values may be used that may represent a constant value and/or a value representing connections from neighboring processors (e.g., a first in, first out "FIFO") link). Thus, the present invention provides and defines an operand spec in a SIMD instruction that indicates a neighboring ("N") SIMD lane(s) (which indicates a SIMD lane in a SIMD processor array as compared to is indicating which processor). In one aspect, each SIMD lane may have a particular name and for each lane and a selected operand, when the operand wants data from a neighboring SIMD lane, the input/data may be received from an identified and/or selected SIMD lane according to the operand spec. In this way, the input/data is not dependent on a type of operations. The input/data from a selected/identified neighbor SIMD lane may then be used for a selected reduction operation without requiring any explicit data movement between the SIMD lanes. For example, an 8 SIMD type processor array (e.g., "SIMD-8") may require one neighbor SIMD spec per operand.

Figure 5A:
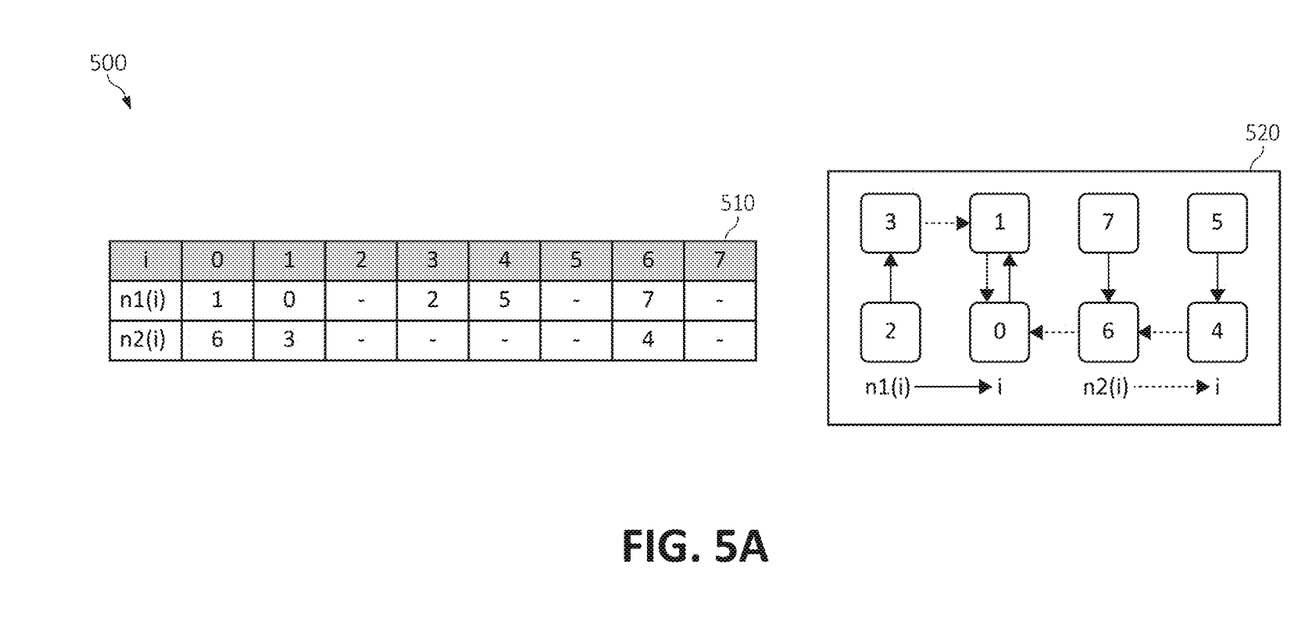
FIGS. 5A-5B are additional block diagrams depicting SIMD reduction operations in accordance with aspects of the present invention
Figure 5B:
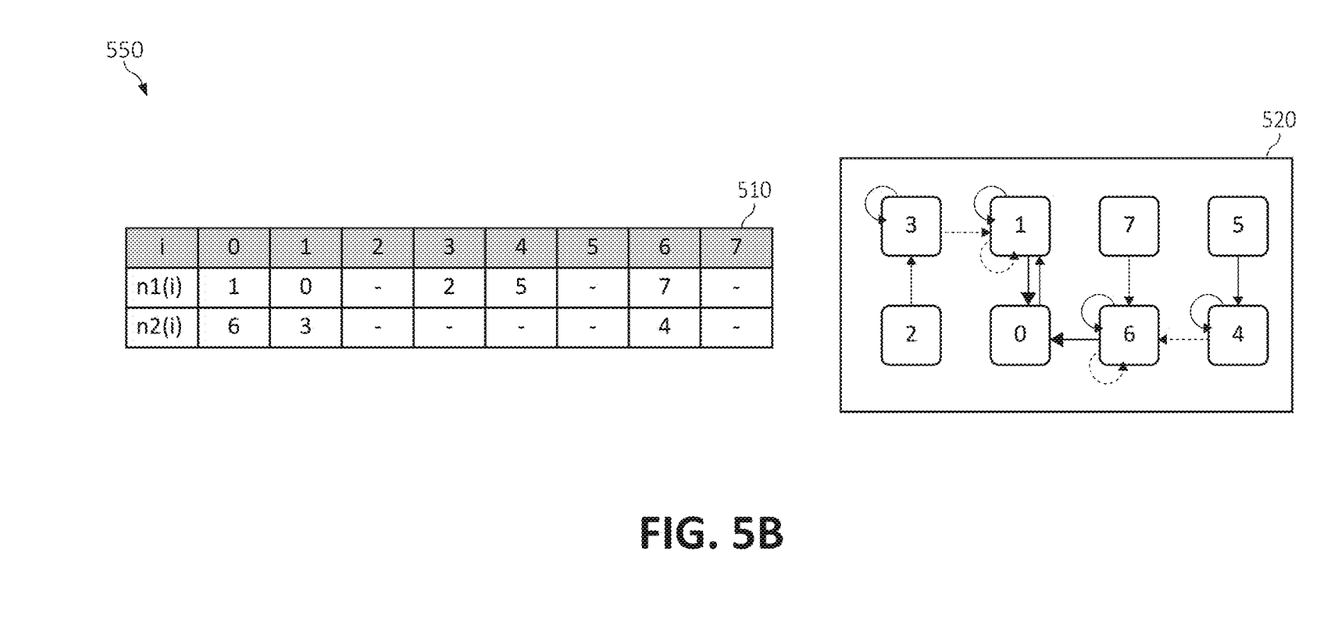

Turning now to FIGS. 5A-5B are block diagrams depicting SIMD reduction operations 500 in an 8 SIMD type processor array (e.g., a SIMD-8 floorplan) according to various mechanisms of the illustrated embodiments is shown. In one aspect, one or more of the components, modules, services, applications, and/or functions described in FIGS. 1-4 may be used in FIG. 5.

As depicted in FIG. 5A, the 8 SIMD type processor array 520 ("SIMD-8" 520) has 8 lanes with a possible physical ordering, such as, for example, lanes 3, 1, 7, 5, 2, 0, 6, and 4 in successive locations on a processor integrated circuit.

In one aspect, binary instructions/operations ("op") may be received. The binary instructions/operations may specify a register ("R"). Alternatively, for each of the two operands (A op B), the binary instructions/operations may indicate "N" indicating the value of that operand used in each lane is to come from a 'neighbor' lane. For example, assume the ISA for the 8-way SIMD type processor array 520 includes a binary instruction, with operand spec fields I1 and I2 to indicate the sources of its two operands. Valid values of E1 and E2 may indicate local registers and possibly other sources. In one aspect, by way of example only, the present invention may include in each operand specification field (e.g., a control field of an instruction) an additional value "N" representing a neighbor SIMD lane.

For example, the SIMD pseudo-op code "R←A op B" means that if A and be are registers the operation 'op' is performed on each element of A and B and the result is placed in register R. That is, each lane of register R gets op performed on the corresponding lanes of the registers A and B.

In an additional aspect, the SIMD pseudo-op code is R←A op N means that each lane of register "R" gets op performed on the corresponding lane of "A" and a neighboring ("N") lane of R. That is, there is a lane-to-lane mapping n2(i), such that for each i, R. i←A.i op R.n2(i). Similarly, the pseudo-op R←N op B uses a mapping n1(i), such that for each i, R.i←R.n1(i) op Bi.

It should be noted that the instruction specifies a whole vector register (e.g., A or B). Implicitly, vector instructions may perform an operation for each lane of the result. A basic SIMD operations may do the same thing for each lane (for all i, R.i←A.i op B.i). Also, n1(i) is the neighbor lane used as the source for the first operand in computing the result in lane i. An essential feature of the present invention is that instead of using lane i of the operand, the data comes from a lane which is a function of a current lane: n1(i). The table in FIG. 5B is an exemplary definition of the functions n1(i) and n2(i). In one aspect, for example, if the first operand is 'N', the computation in lane 0 uses data from lane n1(0), or lane 1.

Table 510 depicts one or more connections (e.g., two connections between each neighbor) and/or mappings between n1(i) and n2(i) which allows any binary SIMD instruction to be reduced across the 8 lanes. The top row of table 510 is for the first operand of an operand instruction and the bottom row is for the second operand of the operand instruction. Thus, one connection may be used for operand 1 such as, for example, n1(i) of row 1 in table 510 and the other connection for operand 2 such as, for example, n2(i) of row 2 in table 510.

For example, the first operand may be for a register where you get the value from the register or may be for a selected neighbor N and the value of the n1(i) of row 1 in table 510. Thus, if the operand indicates using a neighbor, then data will implicitly come from the target register. Unlike in simple SIMD operations, the 'neighbor' data for computation in lane i will not come from lane i of the operand, but from lane n1(i). Thus, the data is extracted from different lanes of the target register and then the result will be placed back into the target register following the operation. For example, if the target register is register 5 ("R5"), the computation of lane 3 of R5 would get its input for the operand from lane 2 of register 5. In lane 0, the input would come from lane 1 and in lane 1 the input would come from lane 0. It should be noted, by way of example and illustration purposes only, that the symbol "-" means no connection is needed.

Consider now a three instruction sequence, based on FIG. 5 for a SIMD-8 reduction operation in register "A." Assume now, for illustration purposes only, the pseudo-op code for SIMD-8 520 op-reduce in register A being:

Red4: A ← N op A // A.1 ← A.0 op A.1,A.3 ← A.2 op A.3,A. 4 ← A.5 op A.4,A.6 ← A.7 op A. 6 and A is partially reduced into A.[1,3,4,6].
Red2: A ← A op N // A.1 ← A.1 op A.3,A.6 ← A.6 op A.4 and A is partially reduced into A.[1,6].
Red1: A ← N op N // A.0 ← A.1 op A.6 and A is partially reduced into A.0.

The circular-shaped arrows illustrate the data movement SIMD-8 520 of FIG. 5B to match the pseudo-code above for the three instructions (e.g., Red4, Red2, and Red1). For the first instruction (e.g., A←N op A) (e.g., A gets N (the neighbor) op register A) the first row n1(1) of table 510 is used since the N (the neighbor) is the first operand in the instruction and A is the second operand in the instruction.

Consider the operation of Instruction Red4: A←N op A//A.1←A.0 op A.1, A.3←A.2 op A.3, A.4←A.5 op A.4, A.6←A.7 op A.6. For lane 1, the first operand for input comes from lane 0 and the second operand is from lane 1 of register A. Thus, whatever the value of register A, the values from lane 0 and 1 may be added and stored in lane 1. The values of lane 3 and lane 2 are added and stored in lane 3. The values of 5 and lane 4 are added and stored in lane 4. Finally, the values of lane 7 and value of lane 6 are added and stored in lane 6. At this point, lanes 2, 0, 7, and 5 may be ignored (do not matter) since the other lanes contain the partially reduced values. At this point, lanes 1, 3, 4 and 6 have been partially reduced each having the sum of two lanes contained therein, which eventually may be reduced to a single lane.

The operation may be performed again where the second operand specifies the neighbor "N" operand using Red2: A←A op N//A.1←A.1 op A.3, A.6←A.6 op A.4. The values from lane 1 and the neighboring value of lane 3 may be added and stored in lane 1, values of lanes 6 and 4 may be added and stored in lane 6. Thus, four of the values have now been reduced to lane 1 and four of the values have now been reduced to lane 6.

Finally, the operation may be performed again where both the first operand and the second operand specify using the neighboring operand using Red1: A←N op N//A.0←A.1 op A.6, where the values from lane 1 and 6 may be added and stored in lane 1. At this point the only value of interest is lane 0. Thus, the values from the first neighbor operand is in lane 3 and added to the value that is in the second neighbor operand in lane 6 and the results are stored in lane 0.

Thus, as illustrated in FIGS. 5A-5B, an 8-way reduction operation requires only three SIMD instructions with no explicit data movement and only one register. The pseudo-code may be executed with instructions with other targets interleaved between the instructions given here. If a reduction is to be done in a loop, the instruction latency may be hidden by unrolling and interleaving several iterations of the loop. Compared to the current state of the art, the present invention reduces latency, program space and register footprint for reduction by at least two times for all SIMD widths with no instruction-specific control logic or ISA features being required. In one aspect, for SIMD arrays up to SIMD-8, only one additional operand spec value is needed for each operand in a binary SIMD instruction format.

Figure 6:
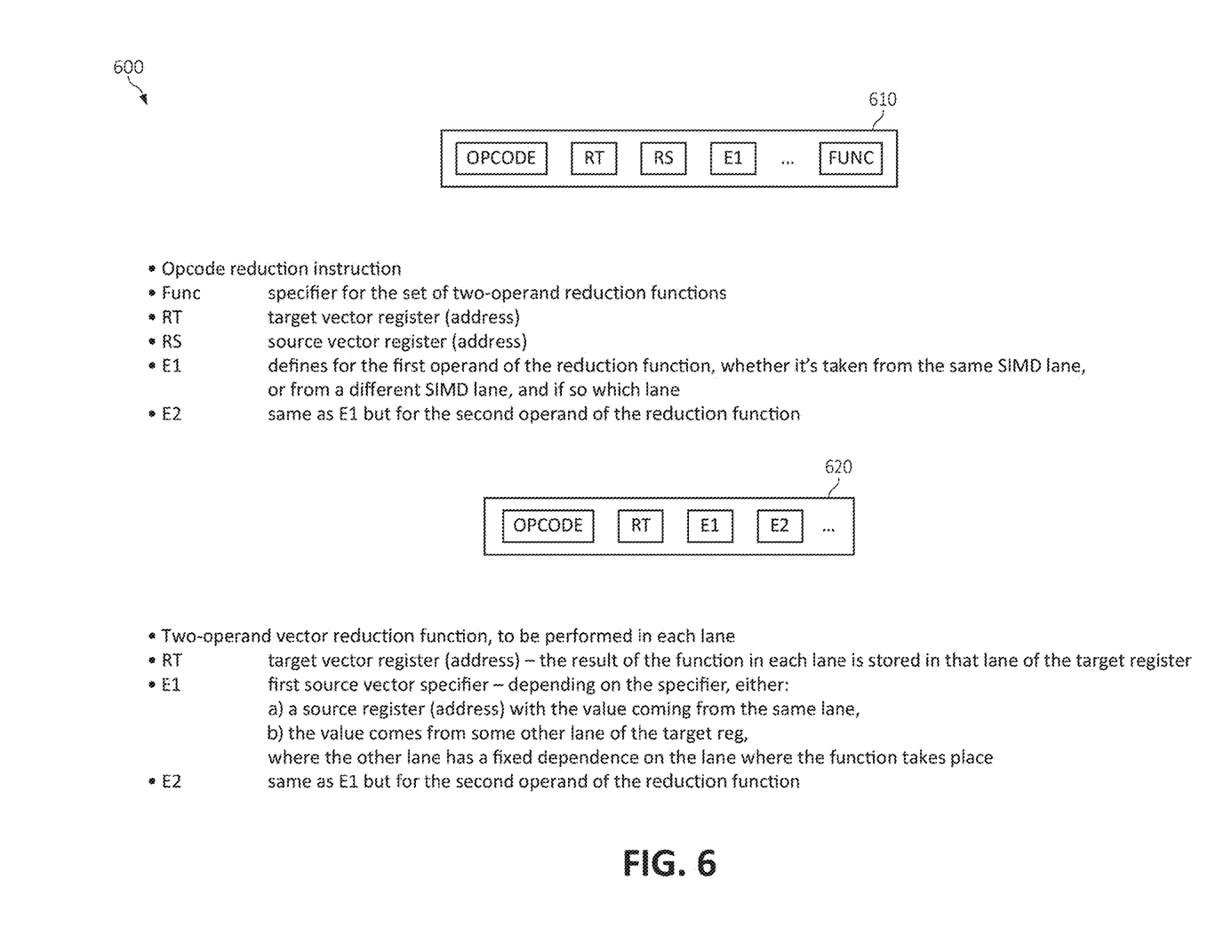
FIG. 6 is an additional block diagram depicting example instruction formats for a SIMD reduction operation according to an embodiment of the present invention.

FIG. 6 is an additional block diagram 600 depicting example instruction formats for a SIMD reduction operation. In one aspect, one or more of the components, modules, services, applications, and/or functions described in FIGS. 1-4 may be used in FIG. 5.

One or more instruction formats such as, for example, instruction format 610 and instruction format 610 may be used. Each instruction such as, for example, instruction format 610 and instruction format 610 may directs a processor to use neighbor elements/lanes of the target register as one of the operands.

In one aspect, by way of example only, instruction format 610 may include an "opcode" specifying a reduction instruction, a function ("Func") specifier for a set of two-operand reduction functions, a target vector register ("RT") (e.g., an address), a source vector register ("RS") (e.g., an address), a field "E1" that may define for the first operand of the reduction function, whether it's taken from the same SIMD lane, or from a different SIMD lane, and if so which lane, a field "E2" that may define for the second operand of the reduction function, whether the value for the second operand is taken from the same SIMD lane, or from a different SIMD lane, and if so which neighboring lane.

In an additional aspect, by way of example only, instruction format 620 may be for a two-operand vector reduction function that is to be performed in each lane. The instruction format 620 may include an "opcode" specifying an instruction, a target vector register ("RT") (e.g., an address), a first source vector specifier (e.g., "E1"), depending on the specifier, either: a) a source vector register ("RS") (e.g., an address) with the value coming from the same SIMD lane, b) a value that comes from some other SIMD lane of the target register ("RT"), where the other SIMD lane has a fixed dependence on the SIMD lane where the function takes place, a second source vector specifier (e.g., "E2") which is similar to E1 but for the second operand of the reduction function.

It should be noted that other possible instruction formats may be used and specify that neighbor lanes should be used (e.g., a 1-input format may be extended to indicate which operand uses an input register and which uses a neighbor SIMD lane, and/or use a field which indicates an input register could have a special value).

Figure 7:
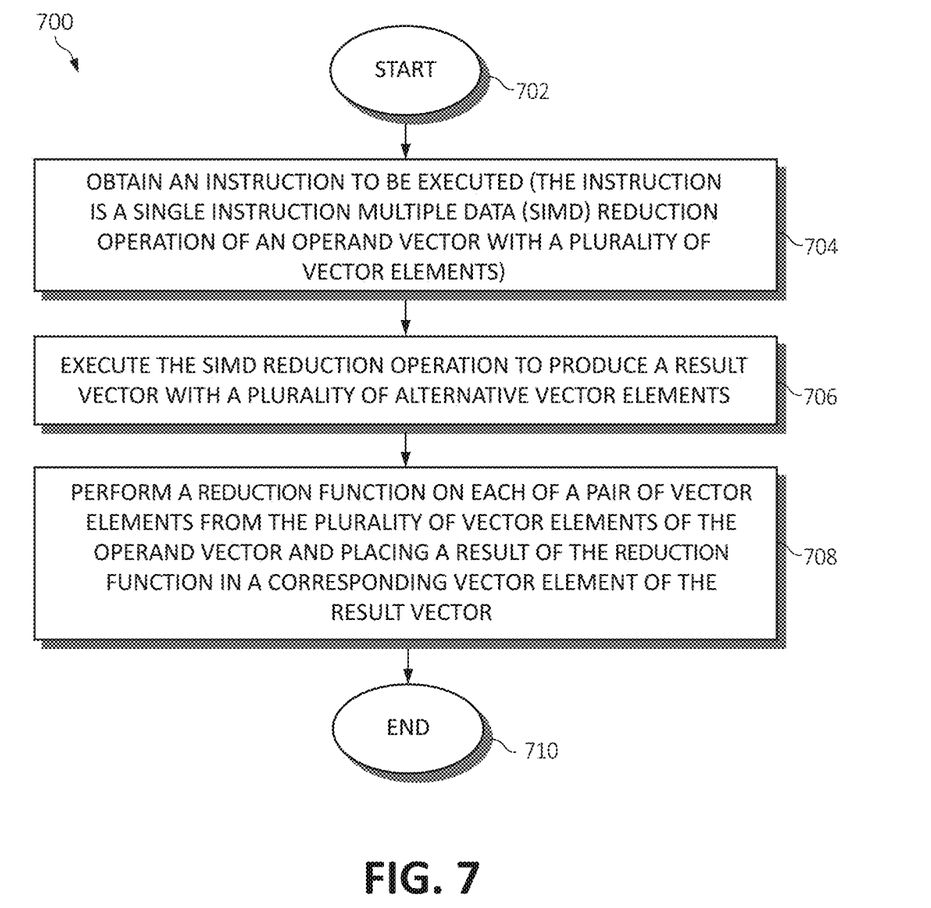
FIG. 7 is a flowchart diagram depicting an exemplary method for facilitating data processing using SIMD reduction operations in a computing environment according to an embodiment of the present invention by a processor, in which aspects of the present invention may be realized.

Turning now to FIG. 7, a method 700 for facilitating data processing in a computing environment by a processor is depicted, in which various aspects of the illustrated embodiments may be implemented. That is, FIG. 7 is a flowchart of an additional example method 700 for facilitating data processing in a computing environment according to an example of the present technology. The functionality 700 may be implemented as a method executed as instructions on a machine, where the instructions are included on at least one computer readable medium or one non-transitory machine-readable storage medium. The functionality 700 may start in block 702.

An instruction to be executed may be wherein the instruction is a single instruction multiple data (SIMD) reduction operation of an operand vector with a plurality of vector elements, as in block 704. The SIMD reduction operation may be executed to produce a result vector with a plurality of alternative vector elements, as in block 706. One or more reduction functions may be performed on each of a pair of vector elements from the plurality of vector elements of the operand vector and a result of the one or more reduction functions may be placed in a corresponding vector element of the result vector, as in block 708. The functionality 700 may end, as in block 710.

Figure 8:
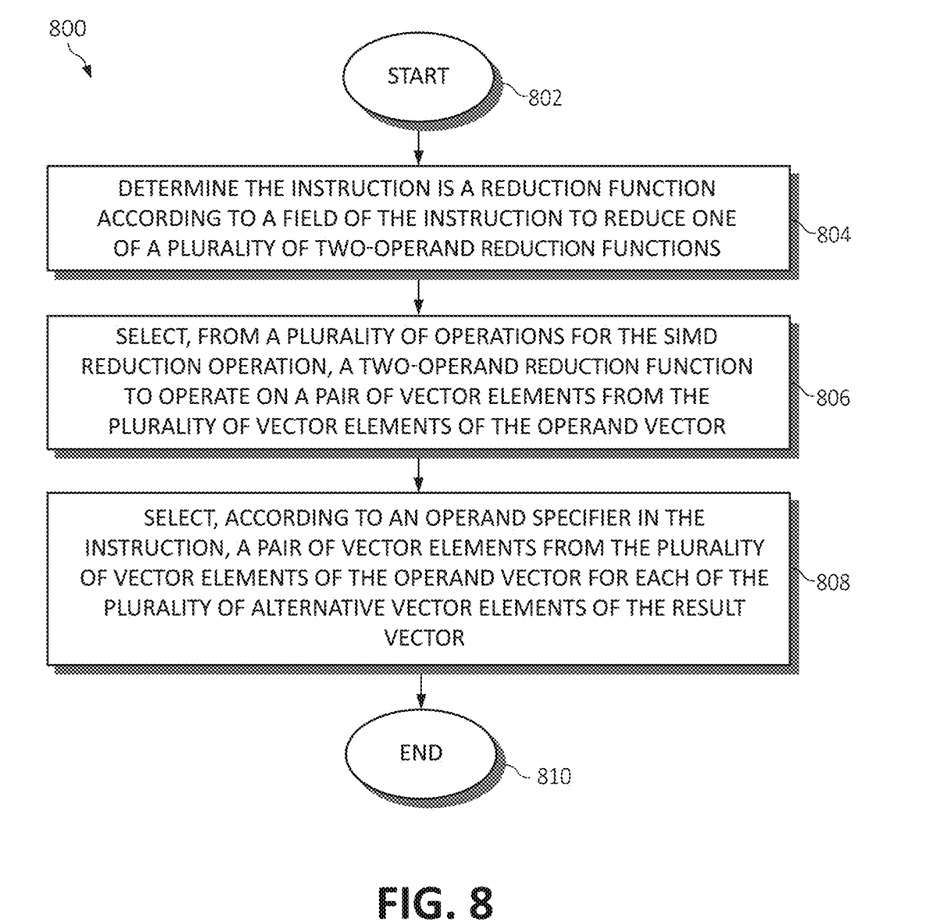
FIG. 8 is a flowchart diagram depicting an exemplary method for facilitating data processing using SIMD reduction operations in a computing environment according to an embodiment of the present invention by a processor, in which aspects of the present invention may be realized.

Turning now to FIG. 8, a method 700 for executing the SIMD reduction operation to produce a result vector with a plurality of alternative vector elements in a computing environment by a processor is depicted, in which various aspects of the illustrated embodiments may be implemented. That is, FIG. 8 is a flowchart of an additional example method 800 for executing the SIMD reduction operation to produce a result vector with a plurality of alternative vector elements of FIG. 7 in a computing environment according to an example of the present technology. The functionality 800 may be implemented as a method executed as instructions on a machine, where the instructions are included on at least one computer readable medium or one non-transitory machine-readable storage medium. The functionality 800 may start in block 802.

An instruction may be determined to be a reduction function according to a field (e.g., a control field) of the instruction to reduce one of a plurality of two-operand reduction function, as in block 804. A two-operand reduction function to operate on a pair of vector elements from the plurality of vector elements of the operand vector may be selected, from a plurality of operations for the SIMI) reduction operation, as in block 806. A pair of vector elements may be selected, according to an operand specifier in the instruction, from the plurality of vector elements of the operand vector for each of the plurality of alternative vector elements of the result vector, as in block 808. The functionality 800 may end, as in block 810.

In one aspect, in conjunction with and/or as part of at least one block of FIGS. 7 and 8, the operations of 700 and 800 may include each of the following. The operations of 700 and 800 may perform a reduction function on each of a pair of vector elements from the plurality of vector elements of the operand vector and placing a result of the reduction function in a corresponding vector element of the result vector.

The operations of 700 and 800 may define in the instruction, an operand specifier for a set of two-operand reduction functions, a target vector, and a source vector, indicate a first operand or a second operand of the plurality of two-operand reduction functions is selected from a similar SIMD lane or from an identified alternative SIMD lane, and/or indicate, by an operand specifier in the instruction, for each of the plurality of alternative vector elements in the result vector and corresponding ones of the plurality of vector elements of the operand vector, that the operand vector has an equal or non-equal number of vector elements as the result vector.

The operations of 700 and 800 may generate the result vector having a first SIMD lane containing the result vector of the operand vector on $2^N$ lanes of one input $2^N$-way SIMD processor element in which N number of reduction operations of the operand vector.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for facilitating data processing in a computing environment by one or more processors comprising:
obtaining an instruction to be executed, wherein the instruction is a single instruction multiple data (SIMD) reduction operation of an operand vector with a plurality of vector elements; and
executing the SIMD reduction operation to produce a result vector with a plurality of alternative vector elements, wherein the SIMD reduction operation of the operand vector is performed using data identified from neighboring SIMD lanes according to a defined operand specifier in the instruction without performing any permute and add instructions on values within the neighboring SIMD lanes, and wherein the defined operand specifier includes an additional value indicating an explicit one of the neighboring SIMD lanes from which to retrieve the data and is included in the instruction irrespective of which binary function is to be performed specified by a function specifier in the instruction.

2. The method of claim 1, further including determining the instruction is a reduction function according to a field of the instruction to reduce one of a plurality of two-operand reduction functions.

3. The method of claim 1, further including selecting, from a plurality of operations for the SIMD reduction operation, a two-operand reduction function to operate on a pair of vector elements from the plurality of vector elements of the operand vector.

4. The method of claim 3, further including providing the result vector with a first SIMD lane of the result vector containing a result of applying a selected reduction function to all SIMD lanes of an $2^N$-way input vector after applying the SIMD reduction operation a selected N times, wherein N is a positive integer or selected value.

5. The method of claim 1, further including selecting, according to the operand specifier in the instruction, a pair of vector elements from the plurality of vector elements of the operand vector for each of the plurality of alternative vector elements of the result vector.

6. The method of claim 1, further including performing a selected reduction function on each of a pair of vector elements from the plurality of vector elements of the operand vector and placing a result of the selected reduction function in a corresponding vector element of the result vector.

7. The method of claim 1, further including:
defining in the instruction, the operand specifier for a set of two-operand reduction functions, a target vector, and a source vector;
indicating a first operand or a second operand of the plurality of two-operand reduction functions is selected from a similar SIMD lane or from an identified alternative SIMD lane; or
indicating, by the operand specifier in the instruction, for each of the plurality of alternative vector elements in the result vector and corresponding ones of the plurality of vector elements of the operand vector, that the operand vector and the result vector are from similar or non-similar SIMD lanes.

8. A system for facilitating data processing in a computing environment, comprising:
a memory device storing an instruction; and
a processor in communication with the memory device, the processor comprising:
a plurality of vector registers, each vector register divided into a plurality of single instruction multiple data (SIMD) lanes; and
execution circuitry coupled to the plurality of vector registers, wherein the execution circuitry:
obtains the instruction to be executed from the memory device, wherein the instruction is a SIMD reduction operation of an operand vector with a plurality of vector elements; and
executes the SIMD reduction operation to produce a result vector with a plurality of alternative vector elements, wherein the SIMD reduction operation of the operand vector is performed using data identified from neighboring SIMD lanes of the plurality of SIMD lanes according to a defined operand specifier in the instruction without performing any permute and add instructions on values within the neighboring SIMD lanes, and wherein the defined operand specifier includes an additional value indicating an explicit one of the neighboring SIMD lanes from which to retrieve the data and is included in the instruction irrespective of which binary function is to be performed specified by a function specifier in the instruction.

9. The system of claim 8, wherein the execution circuitry determines the instruction is a reduction function according to a field of the instruction to reduce one of a plurality of two-operand reduction functions.

10. The system of claim 8, wherein the execution circuitry selects, from a plurality of operations for the SIMD reduction operation, a two-operand reduction function to operate on a pair of vector elements from the plurality of vector elements of the operand vector.

11. The system of claim 10, wherein the execution circuitry provides the result vector with a first SIMD lane of the result vector containing a result of applying a selected reduction function to all SIMD lanes of an $2^N$-way input vector after applying the SIMD reduction operation a selected N times, wherein N is a positive integer or selected value.

12. The system of claim 8, wherein the execution circuitry selects, according to the operand specifier in the instruction, a pair of vector elements from the plurality of vector elements of the operand vector for each of the plurality of alternative vector elements of the result vector.

13. The system of claim 8, wherein the execution circuitry performs a selected reduction function on each of a pair of vector elements from the plurality of vector elements of the operand vector and placing a result of the selected reduction function in a corresponding vector element of the result vector.

14. The system of claim 8, wherein:
the operand specifier for a set of two-operand reduction functions, a target vector, and a source vector are defined in the instruction;
a first operand or a second operand of the plurality of two-operand reduction functions is selected from a similar SIMD lane or from an identified alternative SIMD lane according to an indication in the instruction; or
for each of the plurality of alternative vector elements in the result vector and corresponding ones of the plurality of vector elements of the operand vector, the operand specifier in the instruction indicates that the operand vector and the result vector are from similar or non-similar SIMD lanes.

15. A computer program product for, by a processor, facilitating data processing in a computing environment, the computer program product comprising a non-transitory computer-readable storage medium having computer-readable program code portions stored therein, the computer-readable program code portions comprising:
an executable portion that obtains an instruction to be executed, wherein the instruction is a single instruction multiple data (SIMD) reduction operation of an operand vector with a plurality of vector elements; and
an executable portion that executes the SIMD reduction operation to produce a result vector with a plurality of alternative vector elements, wherein the SIMD reduction operation of the operand vector is performed using data identified from neighboring SIMD lanes according to a defined operand specifier in the instruction without performing any permute and add instructions on values within the neighboring SIMD lanes, and wherein the defined operand specifier includes an additional value indicating an explicit one of the neighboring SIMD lanes from which to retrieve the data and is included in the instruction irrespective of which binary function is to be performed specified by a function specifier in the instruction.

16. The computer program product of claim 15, further including an executable portion that determines the instruction is a reduction function according to a field of the instruction to reduce one of a plurality of two-operand reduction functions.

17. The computer program product of claim 15, further including an executable portion that:
selects, from a plurality of operations for the SIMD reduction operation, a two-operand reduction function to operate on a pair of vector elements from the plurality of vector elements of the operand vector; or
selects, according to the operand specifier in the instruction, the pair of vector elements from the plurality of vector elements of the operand vector for each of the plurality of alternative vector elements of the result vector.

18. The computer program product of claim 17, further including an executable portion that provides the result vector with a first SIMD lane of the result vector containing a result of applying a selected reduction function to all SIMD lanes of an $2^N$-way input vector after applying the SIMD reduction operation a selected N times, wherein N is a positive integer or selected value.

19. The computer program product of claim 15, further including an executable portion that performs a selected reduction function on each of a pair of vector elements from the plurality of vector elements of the operand vector and placing a result of the selected reduction function in a corresponding vector element of the result vector.

20. The computer program product of claim 15, further including an executable portion that:
defines in the instruction, the operand specifier for a set of two-operand reduction functions, a target vector, and a source vector;
indicates a first operand or a second operand of the plurality of two-operand reduction functions is selected from a similar SIMD lane or from an identified alternative SIMD lane; or
indicates, by the operand specifier in the instruction, for each of the plurality of alternative vector elements in the result vector and corresponding ones of the plurality of vector elements of the operand vector, that the operand vector and the result vector are from similar or non-similar SIMD lanes.

\* \* \* \* \*